Jan. 10, 1967  J. W. MARSHALL  3,297,006
ROTARY PUMPS AND ENGINES
Filed April 14, 1964  6 Sheets-Sheet 1

Inventor
John W. Marshall

By
Watson Cole, Grindle & Watson,
Attorneys

Inventor
John W. Marshall
By
Watson, Cole, Grindle & Watson
Attorneys

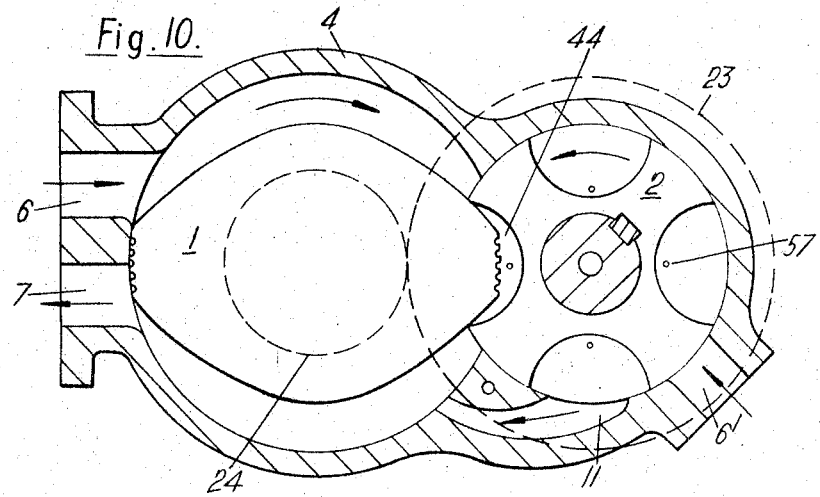
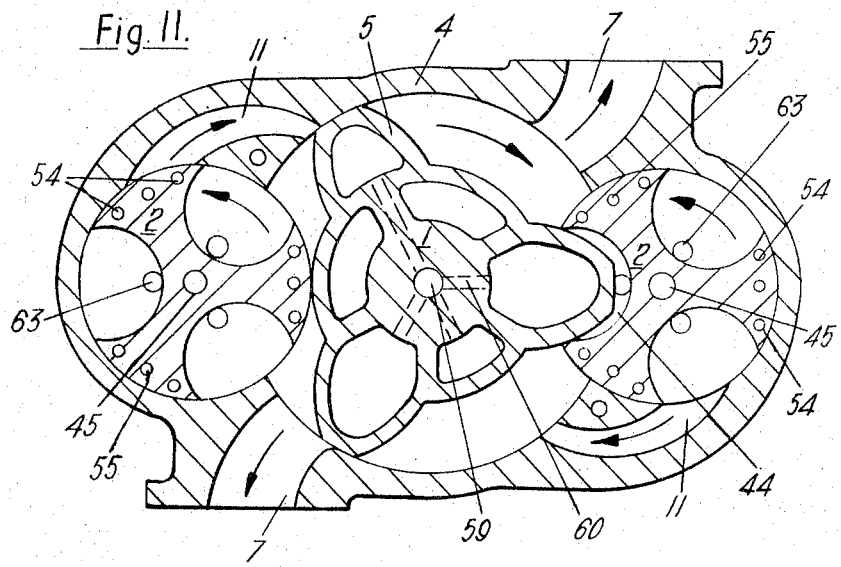

United States Patent Office 3,297,006
Patented Jan. 10, 1967

3,297,006
ROTARY PUMPS AND ENGINES
John Wilmott Marshall, 19 Eastfield Road,
Royston, England
Filed Apr. 14, 1964, Ser. No. 359,587
Claims priority, application Great Britain, Apr. 19, 1963,
15,430/63; May 22, 1963, 20,336/63; July 31, 1963,
30,264/63
19 Claims. (Cl. 123—13)

This invention relates to rotary engines and motors. More specifically, the invention is concerned with rotary engines or motors of the type in which at least two interengaging rotors, having parallel shaft axes, rotate in opposite directions inside a stator casing.

According to the present invention, there is provided a rotary engine or motor comprising a casing enclosing rotor chambers, a male rotor and at least one female rotor of smaller swept circle diameter mounted for rotation in the rotor chambers in opposite directions and arranged so that each continually maintains frictionless close running clearance with its mating rotor and with the casing walls, the male rotor having a plurality of substantially cycloidal shaped lobes each of which fits into a corresponding cavity in the female rotor during rotation but without filling the cavity to its whole depth whereby a combustion or work space is maintained in each said cavity in the female rotor. In the case of an engine, there is provided a connection to the male rotor chamber for entry of combustion air which travels round between the rotors and the casing walls as the rotors rotate and is compressed by the leading face of each male lobe into its female cavity, fuel being ignited therein after which the gases exert pressure on the rear face of the male lobe causing the male rotor to rotate thereby progressively increasing the expansion volume until the male rotor lobe tip passes an outlet port whereupon the gases leave the engine. Means, such as a communicating pressure-balancing duct, may be provided to enable the high pressure gases in each female rotor cavity to expand fully and to the final exhaust pressure of the male rotor cell volume.

Such an arrangement provides an engine having a very high mechanical efficiency without any friction in the rotating piston chambers and hence no lubricating oil is burnt thereby reducing carbon deposits. The volumetric and thermal efficiencies are also high, and the mechanical design is such that the engine can be run at very high rotational speeds, which, with the high torque produced by this engine, enables very high power outputs to be obtained. This is, in effect, a multi-cylinder engine which is mechanically simple with only two or three main moving parts and the manufacturing cost is low.

According to one embodiment of the invention a rotary piston internal combustion engine of this kind is operated in such a manner that the scavening air at a higher pressure than the escaping exhaust gases, flows through inlet ports into the cylinder volumes created by the rotation of the male rotor piston lobes and also into the corresponding female rotor cavities, fuel being injected into the air stream whilst it is being compressed. Either the Otto, constant volume, or the diesel constant pressure cycles may be used with the compressed mixture being ignited by a timed spark or continuous glow plug or spontaneous ignition being arranged due to the heat of compression and the high compression ratio employed.

In another embodiment of engine, two female rotors are used with a single male rotor, inlet ports being provided into each half of the male rotor chamber and also into each female rotor cylinder with outlet ports being provided to each half of the male rotor chamber and also to each female rotor cylinder bore in those embodiments where no communicating duct is employed.

In another embodiment of this engine, a rotary barrier valve is used to separate the inlet port from the exhaust port. By employing this barrier valve which is normally geared 1:1 to the male rotor and which rotates in the opposite direction to the male rotor, the fresh charge will be drawn into the engine by the male rotor lobes and no pressure blower is then required to fill the main male rotor cylinder volume. At the same time the cavities in the barrier valve rotor are filled by the incoming charge and these are expelled by the male rotor lobes up a communicating pipe which connects with a port leading to the female rotor chamber. In this way the female rotor cavities are filled with fresh charge by the barrier rotary valve and at the same time this fresh charge expels burnt gases from each cavity of the female rotor.

Normally, no scavenge blower would be used with the rotary barrier valve, but such an additional blower could be used to provide additional air and cooling.

In order that full and equal expansion shall occur in each female cavity as in the main male rotor cylinder volume, nearly all embodiments of this engine are provided with a pressure-balancing duct communicating between the female rotor cylinder bore and the male rotor cylinder bore, however, one embodiment has been shown in which these balancing ducts are not required. This duct not only permits each female rotor cavity to be expanded down to the final exhaust pressure, but it also permits scavenge air or mixture to be admitted into each female cavity and to flow from these cavities through the communicating duct to the male rotor cylinder and thence out of the exhaust port. In this way complete scavenging of the products of combustion takes place in the female rotor cavities and the operating temperature of the female rotor is held down to a reasonable figure.

In the preferred constructions, the male and female rotors have been shown with two, three, four and five lobes and usually a lesser number of female cavities. That is to say the gear ratio between the male and female rotors need not be 1:1, and similarly, the ratio between the male rotor hub diameter and the female rotor diameter need not be 1:1 various alternative constructions have been shown.

Means have been shown for internally cooling the rotors with passages fashioned in them so that the cooling medium under pressure shall be forced to pass through each rotor and thence out of the engine to an external cooler whence the coolant is then caused to flow round and round this closed circuit removing excess heat from the rotors whilst they are running.

The above and other features of the invention will be apparent in the following description, given by way of example, of various rotary engine constructions embodying the invention, reference being had to the accompanying diagrammatic drawings.

In the drawings:

FIGURE 1 is a cross section through a first engine construction, showing a two rotor, twin lobe engine geared together 1:1, FIGURE 2 is a section on the line II—II of FIGURE 1, FIGURE 3 is a cross section through a second construction of a double engine having two female rotors with a male rotor having three lobes, the rotors being geared together 1:1, FIGURE 4 is a cross section through a third construction in which a five-lobed male meshes with two female rotors each having three cavities and geared together in the ratio 5:3. As in FIGURE 3 this is also a double engine.

FIGURE 5 is a cross section through a fourth construction of a single engine having a three-lobed male rotor meshing with a single female rotor having three cavities and also with a rotary barrier valve also having three cavities and geared together 1:1.

FIGURE 6 is a cross section through a fifth construction of a single engine similar to FIGURE 5 but with wider lobes and cavities, FIGURE 7 is a section through the female rotor of FIGURE 6, FIGURE 8 is a cross section through a sixth construction of a single engine employing a four-lobed male rotor co-operating with a female rotor having three cavities and geared together in the ratio of 4:3, FIGURE 9 is an end view of the female rotor 2 in FIGURE 8, FIGURE 10 is a cross section through a seventh construction of a single engine in which the female rotor 2 is the slow speed member, the male rotor being geared up in the ratio of 2:1 and in which two male lobes mesh with four cavities in the female rotor, FIGURE 11 is a cross section through a three rotor motor or prime mover and is not an internal combustion engine relying on high pressure gas, air, vapours, steam or other fluid media for its propulsion, FIGURE 12 is a section through one of the female rotors 2 of FIGURE 11 and shows the method of leading the high pressure fluid medium into each female cavity.

In the description that now follows, parts in different embodiments that perform the same function are given the same reference numerals.

Referring firstly to FIGURES 1 and 2, the rotary piston internal combustion engine here shown consists primarily of a casing 4 and interengaging male and female rotors 1 and 2 within the casing. The casing internal configuration is based on the shape afforded by two parallel imaginary intersecting cylinders of different sizes, the large and small cylinders corresponding respectively to the solids of revolution traced by the male and female rotors. The main inlet port 6 is positioned adjacent to the outlet port 7 with a second inlet port 6′ provided for the female rotor 2.

The male rotor 1 consists of a cylindrical hub 27 carrying two diametrically-opposed lobes 5 with cycloidal shaped profiles. The female rotor 2 has basically the form of a cylinder with a pair of diametrically-opposed cavities 28 which receive the lobes 5 on the male rotor as the two rotors rotate. The rotors turn in opposite directions as indicated by the arrows 29 at the same revolution rate and their dimensions and configurations are such that each maintains a close running clearance both with the internal wall of the casing and with the other rotor; the clearance is no greater than is necessary to obtain frictionless running and is kept small enough to restrict gas leakage as far as possible. Both rotors may be constructed of metals having the lowest coefficient of expansion at the operating temperature.

The rotors have shafts 30, 31 which are intercoupled by meshing gears 23, 24 disposed in a gear housing 26 external to the rotor casing, and the male rotor shaft is extended to carry a pinion gear 32 which meshes with an output shaft gear, shown dotted 33, so that the engine rotors may be geared up in speed to rotate much faster than the output shaft. The rotors are mounted on bearings 22 which are bolted into their housings in the intermediate plates 18 by plates 25. Adequate passages for the cooling medium 65 are provided in the rotor casing 4 and the intermediate plates 18. Because of the high gas loadings imposed on the rotors and their high rotational speeds, adequate bearings are required for both rotors and an outrigger bearing may be required to support the resultant loads of the driving gear 32.

It will be appreciated that all work and all driving torque in these engines is supplied by the male rotor and the female rotors have a balanced gas loading in their cavities and therefore take no power to drive them. Consequently, there is very little power transmitted through the rotor mating gears.

In order to improve sealing, labyrinth grooves 16 are provided at the tips of the male rotor lobes 5, also at 15 in the female rotor bore and on both rotor shafts 35. The female rotor 2 is provided with end plates 21 recessed into the intermediate plates 18 and also having circumferential labyrinth grooves 36. The male rotor lobes rotate between these circular end plates 21 with a close running clearance thereto.

The cavities 28 in the female rotor are fashioned to provide the rotary combustion chambers of this engine and are of such a volume at the top centre position shown in FIGURE 1 that the correct clearance volume is provided in relation to the displacement of the engine to give the required compression ratio. Any degree of compression ratio may be provided by altering the shape of these cavities and depending on whether the constant volume or constant pressure cycles are used, in this connection reference may be had to FIGURES 3 and 4 where much higher compression ratios have been shown than in FIGURE 1.

As the rotors turn, air entering at the inlets 6 and 6′ from a blower (not shown) is trapped in the spaces between each rotor and the walls 4 and 18 of the casing and is carried around by both rotors being compressed into the female rotor cavities 28. Fuel is injected continuously into the air as it is being compressed through the injector 10 by means of a fuel pump and controlling means not shown, said fuel pump being driven by the engine or by external means.

A spark plug 9 provides a timed spark for igniting the charge and the ignition device also driven by the engine and not shown, may provide two or more sparks per revolution of the rotors depending on the number of male rotor lobes and whether one or two female rotors are used. Thus in FIGURE 3, and if spark ignition is used, six ignitions per revolution of the rotors would be provided, three to each female rotor and in FIGURE 4, five ignitions per revolution to each female rotor making ten firings per revolution of the male rotor.

Owing to the heavy load on a single spark plug at high speeds, two or more spark plugs may be used at this point firing alternately to increase the spark plug electrode life.

Immediately after top centre, positive torque is applied to the rear face of the male rotor lobe by the burning charge in the combustion chamber 28 and this torque reaches a maximum depending on the lobe width, gear ratio between the male and female rotor and ratio between the male rotor hub diameter and the female rotor diameter. This is an engine having a fixed fulcrum distance, whereas, the reciprocating engine is a variable fulcrum distance engine which does not obtain maximum fulcrum distance until some 80° after top centre. In this rotary engine maximum fulcrum distance is provided, depending on the geometry, 15°–30° after top centre. This means that very high torque is obtained close to top centre and before the gas pressure has been allowed to drop appreciably.

In order that the high pressure burning gases in the female cavities 28 shall be able to expand down to the male rotor exhaust pressure, a communicating duct 11 is provided in the stator casing 4 so that each male rotor lobe tip shall have just cleared the port 38 before the female cavity 28 reaches the duct edge 39. Each cavity 28 must not reach the edge of inlet port 6′ until the male rotor lobe tip has cleared the exhaust port 7 and until the pressure in the communicating duct 11 has dropped to below the incoming air pressure. This is usually referred to as the "blow-down" period.

Spark plug 9 is unable to provide a spark later than some 30° before top centre and as this may be too early for starting-up purposes and for slower speed running, a second spark plug or glow plug 9' is provided either in the duct 11 or immediately opposite to spark plug 9 so that ignition may also be arranged to take place after top centre.

As the portion 12 of the stator casing is subjected to high heat stress, a coolant hole 13 is provided for the cooling medium to flow through this portion. In FIGURE 4 a coolant passage 65 has been shown to give additional cooling at this point.

Another fuel injection embodiment has been shown dotted in FIGURES 1 and 2. Instead of employing an injector 10 in the stator casing, the fuel is supplied under pressure from an external pump through the distribution valve 40 on the casing 20 and thence along the dotted holes 41 to nozzles 42 in the lobe tips. Alternatively, and in the same manner, the female rotor could be used instead of the male rotor for dispensing fuel to each of the female cavities 28 via holes up the shaft 31. This might be a superior arrangement to that shown because the fuel ducts would be much shorter in length and virtually no unburnt fuel would be lost out of the exhaust port.

Referring to FIGURE 1, it will be seen that the expansion volume has been arranged to be larger than the aspired volume because the exhaust and inlet ports are not equally disposed on either side of the axis line II—II. By this means the gases may be expanded to a greater degree than in a reciprocating engine before release to atmosphere thereby appreciably reducing the "blow-down" period and extracting more work from the gases. If it is proposed to use an exhaust driven turbo-charger for obtaining charge and scavenge air, then this expansion volume must not be too great otherwise there will be insufficient energy for driving the turbo-charger.

FIGURE 3 is a cross section through a double engine in which a three-lobed male rotor co-operates with two female rotors each having three cavities and geared 1:1 with the male rotor. The main point of interest in this embodiment is that the balance ducts 11 have been dispensed with, and instead, an exhaust port 7' has been provided for each female rotor. By widening the male lobes 5 and the female cavities 28 and because of the double configuration of this engine, it is possible to arrange for the gases in each of the female cavities 28 to leave the engine via their exhaust ports 7' at exactly the same pressure as the male cell volumes via their exhaust ports 7. Therefore, no pressure equalising ducts are required.

In FIGURE 3 scavenge air is supplied from a blower to ports 6 and 6' and four exhaust ports 7 and 7' are also provided. Fuel injectors 10 may provide either a continuous supply of atomised fuel into the female cavities 28 or they may be of the jerk pump type and supply a measured quantity three times per revolution of each female rotor. Heat of compression may be used to ignite the fuel/air mixture, or spark ignition may be used with the spark plugs (not shown) adjacent to the fuel injectors 10.

Coolant passages 45 and 59 are provided in all three rotors as described in FIGURE 7 so that the coolant may be pumped through each rotor to keep the rotors at the correct working temperature, more or less coolant and a greater or lesser quantity of scavenge air enable the rotor temperatures to be accurately controlled under all conditions of load.

As already mentioned, this engine has six firings per revolution of the rotors with the firings taking place every 60° of rotation. Torque variations are in consequence much reduced over single engines employing two and three lobes and the male rotor gas loads are partially balanced.

FIGURE 4 is another embodiment of a double engine in which a five-lobed male rotor 1 meshes with two female rotors 2 each having three cavities 28 and geared in the ratio of 5:3 with the male rotor. In both FIGURES 3 and 4 the male rotor hub diameter is greater than the diameter of the female rotors.

In order that the gases in the female cavities 28 shall expand uniformly with the male cell volumes, equalising ducts 11 are required and two exhaust ports 7 handle the total exhaust products instead of the four exhaust ports of FIGURE 3. As with FIGURE 3 a blower supplies air to the four inlet ports 6 and 6' and fuel injectors 10 inject the fuel into the female cavities 28. An alternative position of the injectors would be to arrange for them to inject directly into ports 6'. As with FIGURE 3, each female rotor is cooled by coolant passing through the central hole 45 and along the gallery holes 54. In the same way the male rotor is cooled from the central hole 59 and along the holes 61 which are also plugged at each end and thence out of the rotor via the central hole 59 which does not extend completely through the rotor but which is blanked off in the centre (see FIGURE 7).

Referring to FIGURE 5, the male rotor 1 having in this embodiment three lobes 5, meshes with a co-operating and contra-rotating female rotor 2 having three cavities 28 and also with a blower rotor 3, also contra-rotating with respect to the male rotor, and having three cavities 28. In this embodiment, all three rotors are geared together in the ratio of 1:1 and the diameters of the male hub and both the rotors 2 and 3 are equal. Various shapes of cavity in rotor 3 may be used and in order to assist the peripheral flow of the charge out of these cavities they may be cut away as shown dotted 49. FIGURE 6 also shows the rotary barrier valve 3 cut away in the same manner.

The main reason for employing the rotary barrier valve 3 is to enable this engine to dispense with a blower and to employ natural aspiration through a carburetter via the inlet port 6, or to employ fuel injection via the injector 10 aspiring air only through the inlet port 6.

The functioning of this rotor 3 will now be explained. Air, or a mixture of air and fuel, is drawn into the engine through the inlet port 6 as the male rotor lobes 5 rotate and at the same time the cavities 28 are also filled with the incoming charge in the rotor 3. As each male lobe 5 enters its corresponding cavity 28 in rotor 3, the charge is expelled peripherally along the pipe 43 and this pipe 43 is connected to the female rotor inlet port 6'. In this way the rotor 3 fills each of the cavities 28 in the female rotor 2 and as the incoming charge flows into the cavities 28 in rotor 2 the exhaust products are expelled via the duct 11 into the male cells and thence out of the engine through the exhaust port 7.

This embodiment may, therefore, be described as a double-acting four-cycle engine, whereas, FIGURES 1, 2, 3 and 4 refer to two-cycle scavenged engines.

In another embodiment, instead of employing the peripheral duct 43 for leading the charge from the rotor 3, apertures 48 (shown dotted) are fashioned in one or both end plates of the rotor casing and expulsion of the charge from each cavity 28 in rotor 3 by each male lobe 5, would then take place axially into 48. In other embodiments, both axial and peripheral ports may be used.

In order to assist the endwise sealing of each male lobe 5 against the rotor casing end walls and also against the end rotating plates of the female rotor 2, a series of shallow holes or indentations 47 are provided in both end faces of each lobe and also is desired on the end faces of the male rotor hub to act as labyrinths for the gases escaping through these gaps and these take the place of grooves or slots which cannot be used at this point. Whilst vertical slots would provide a gas barrier in the male rotor chamber, such grooves would give negative sealing when the lobe is actually inside the female cavity.

In order that each cavity in the female rotor shall be pressure-balanced whilst pressure is increasing in the male rotor chamber, a communicating duct 11' similar to the exhaust duct 11 may be provided. This has been shown dotted and this duct would be divided to pass round the spark plug 9. Whilst this embodiment provides for balanced compression, the residual volume of compressed charge in this duct is clearance volume and expands back to ambient immediately the male lobe tip has cleared the duct at 51.

The space shown cross hatched at 44 is the minimum combustion volume at top centre and this volume may be designed to give any desired compression ratio.

The output driving shaft of the engine 46 has been shown and this would normally be driven by rotor 1 through gears, chains or cogged belt.

At the high rotational speeds required of the smaller sizes of these engines to minimise gap leakage losses, individual injection of fuel to each combustion chamber is probably not possible because of the time required to initiate complete combustion of the fuel droplets with air. Consequently, a continuous injection of fuel may be arranged to take place into an anti-chamber or cell as a separate embodiment from injection directly into each cavity 28 of the female rotor 2. For the diesel cycle, the fuel injector at 10 would be transferred to the position occupied by the spark plug 9 and an anti-chamber has been shown dotted at 53 into which the fuel would be injected continuously mixing and burning therein with the partially compressed air. It would be necessary to maintain the anti-chamber at a high temperature and it would require to be constructed of heat resistant material. It is probably more efficient to inject directly into the female rotor cavities 28 maintaining these cavities at a high temperature and lining the surface of each cavity with a suitable material such as ceramic, the object being to keep the face of each cavity hot but not to impart this heat to the rotor 2 or cause it to be transferred to the rotor supporting bearings.

Referring to FIGURE 6, the male rotor 1 having in this embodiment three lobes 5, meshes with a co-operating and contra-rotating female rotor 2 having three cavities 28 and also with a by-pass rotor 3, also contra-rotating with respect to the male rotor 1 and having three cavities 41. This single naturally aspirated engine is similar to that described in FIGURE 5 but the male lobes 5 have been much widened and the diameter of the male hub 1 is larger than the diameters of the rotors 2 and 3.

In both embodiments shown in FIGURES 5 and 6, the speed ratio between the rotors 1, 2 and 3 is 1:1 which is shown in FIGURE 6 by the dotted gear pitch circles 23 and 24. As the diameters of 2 and 3 are reduced so the male lobes 5 widen and assume the shape shown in FIGURE 6. The output drive shaft 46 has been shown driving the male rotor 1 through speed-increasing gears 33 and 32. As the male lobes widen and the cavities 28 also widen to accommodate them, the point at which the male volume is admitted to the female volume is advanced, with the result that as shown in FIGURE 6, the male volume is only compressed to around 2:1 or even less pressure ratio before admission to the female cavity takes place. This means that there is little drop in the compression curve when the two volumes meet and that turbulence will be reduced. There is, therefore, no need to employ a balancing duct 11, as shown dotted in FIGURE 5.

FIGURE 7 is a section through the female rotor 2 and shows the method of internally cooling this rotor with a coolant and also methods of fuel injection at or around top centre so that the full diesel constant pressure compression ignition cycle may be employed.

The oil duct 45 does not pass completely through the rotor but is blanked off in the centre. The coolant, which may be oil, is forced under pressure down this hole from a pump and the arrows show the direction of flow. Ducts 56 are fashioned in the ends of the rotor 2 communicating with the gallery passages 54, also shown in previous figures, and thence out at the other end of the rotor by similar ducts 56 communicating with the central hole 45. The rotor end plates 21 may be used to seal the ends of gallery holes 54 or they may be individually plugged.

FIGURE 7 also shows inclined and horizontal fuel injectors 10 delivering atomised fuel spray into each female cavity via small holes 57.

FIGURE 8 is a section through an engine embodying a male rotor 1 having four lobes 5 with its co-operating female rotor 2 but a third rotor may be used either as a second female 2 to convert this single engine into a double engine, or a rotary barrier valve rotor 3 may be used to convert this engine into natural aspiration and as previously described.

FIGURE 8 employs a speed increasing ratio between the male rotor 1 and the smaller female rotor 2. Many speed ratios between these rotors may be used and the respective diameters of the male hub and the female rotor vary in accordance with these speed ratios.

FIGURE 8 shows a four-lobed male 1 meshing with a three-cavity female 2 and having the speed rato of 4:3 or 1.33:1. When four lobes mesh with two female cavities the speed ratio is 2:1 and when three lobes mesh with two cavities the speed ratio is 1.5:1.

Some of the main lobe and speed ratios are given below as examples:

| Males Lobes | Female Cavities | Speed Ratio |
| --- | --- | --- |
| 3 | 2 | 1.5:1 |
| 4 | 3 | 1.33:1 |
| 4 | 2 | 2:1 |
| 5 | 2 | 2.5:1 |
| 5 | 3 | 1.66:1 |
| 5 | 4 | 1.25:1 |
| 6 | 2 | 3:1 |
| 6 | 3 | 2:1 |
| 6 | 4 | 1.5:1 |
| 6 | 5 | 1.2:1 |

These embodiments provide a late admission of the male volume into the female cavity with extremely high turbulence and a degree of inefficiency whilst compressing. Accordingly, a duct or ducts similar to 11' in FIGURE 5 may be provided. This will enable compression to be equalised between the two volumes but will have the effect of reducing turbulence. One of the main advantages of FIGURE 8 is that if a peripherally mounted spark plug is used, similar to FIGURE 6, ignition advance may be reduced to as little as 15° BTC, whereas, all previous embodiments described in FIGURES 1, 3, 5 and 6 provide a minimum ignition advance of 30°–35° BTC. FIGURE 8 also enables full torque to be obtained only 10° ATC.

FIGURE 8 shows fuel injection holes 57 leading into each female cavity as described in FIGURE 7, and either spark ignition or compression ignition may be used in all these engine embodiments.

FIGURE 9 is an end view of the female rotor 2 showing one end plate 21 with its fixing bolts 62 and the fuel injection 57 and coolant hole 45. A slot 58, also shown in FIGURE 7, provides sufficient time for the fuel to flow through the holes 57 into each cavity as each hole passes across the slot face. This slot 58 may be stationary in the casing or it may be fashioned in the plate 21 to rotate with it. The slot is of such a length that it enables injection to take place some 20°–30° before and after top centre.

FIGURE 10 is a diagrammatic view of another embodiment in which the female rotor 2 is the slow speed member and in which the male rotor 1 is geared to run faster via the mating gears pitch circle diameters 23 and 24. Provided that sufficiently robust gears are provided to take the full output of the engine, the drive shaft may be in the female rotor 2 and a speed increase is then obtained to the engine by employing only two gears. In this embodiment various speed ratios and lobe and cavity embodiments may be used as for example:

| Males Lobes | Female Cavities | Speed Ratio |
|---|---|---|
| 2 | 3 | 1:1.5 |
| 2 | 4 | 1:2 |
| 2 | 5 | 1:2.5 |
| 2 | 6 | 1:3 |
| 3 | 4 | 1:1.33 |
| 3 | 5 | 1:1.66 |
| 3 | 6 | 1:2 |

FIGURE 10 shows two male lobes meshing with four female cavities with a speed ratio of 1:2. In all other respects these engines may employ two or three rotors, be double, be scavenged, or naturally aspirated, and employ spark ignition or compression ignition.

FIGURE 11 is a cross section through a three rotor motor or prime mover operating on high pressure gas, air, vapours, steam or other fluid media.

Figure 1:
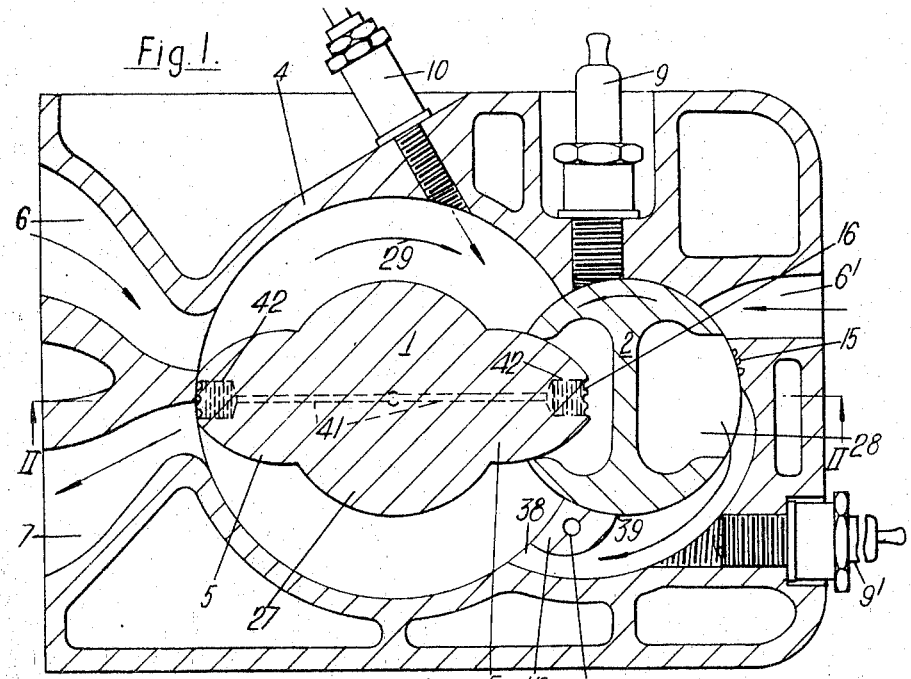
Figure 2:
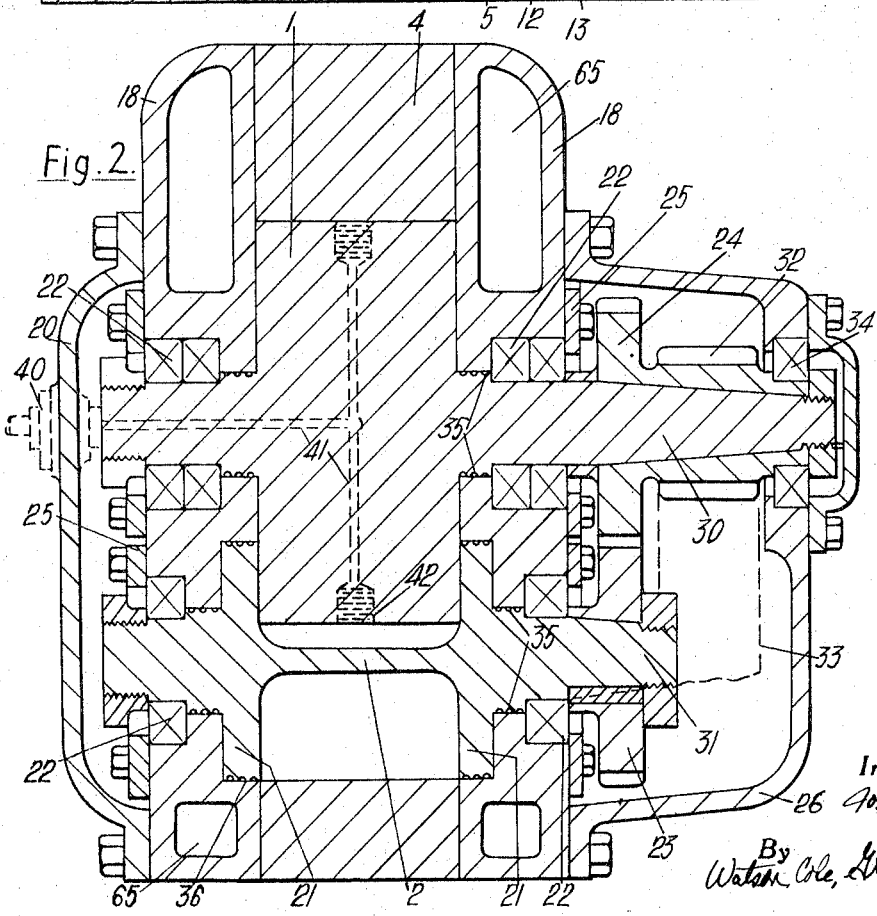
Figure 3:
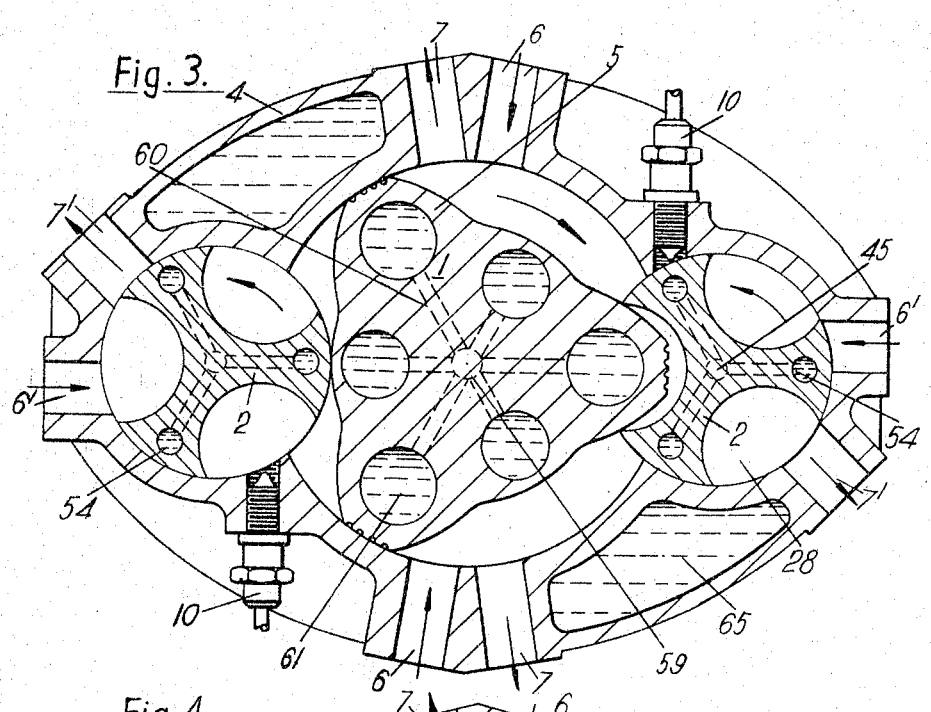
Figure 4:
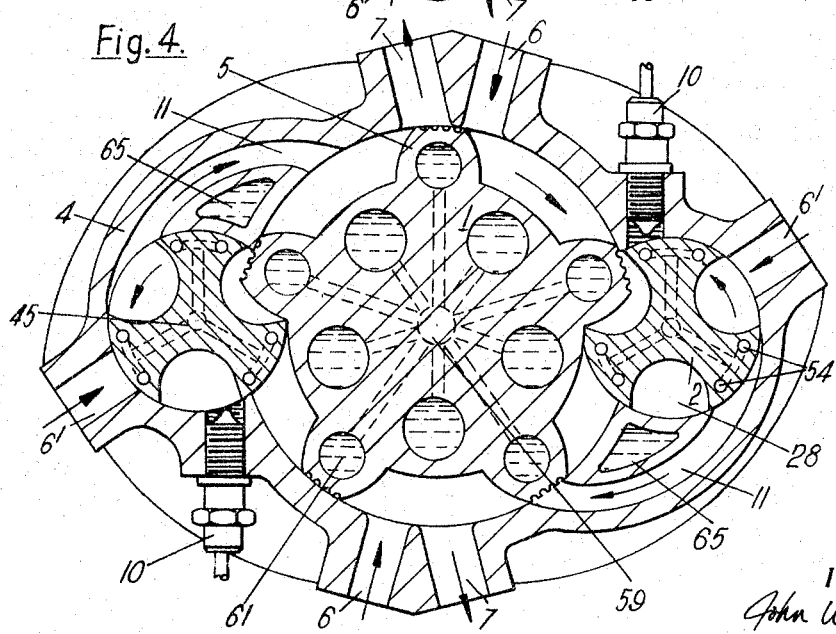
Figure 5:
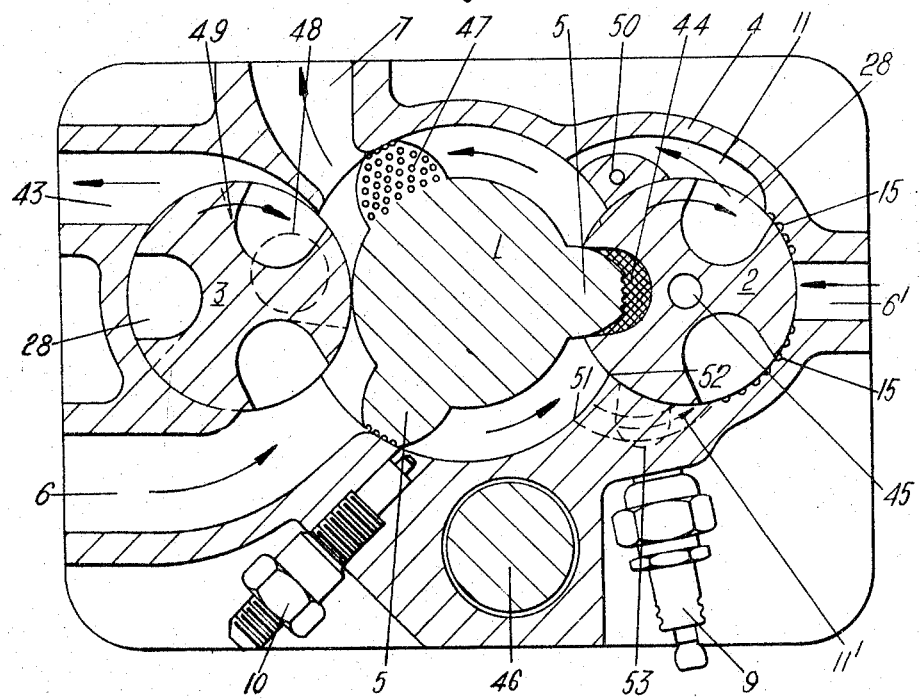

A male rotor having three lobes has been shown cooperating with two female rotors 2 each having three cavities and geared together 1:1. However, any of the other embodiments described may be used for this motor. All rotors will be required to be internally cooled by the method already described if high temperature fluid media are used and these coolant ducts in the rotors have been shown in FIGURES 11 and 12. This expansion engine may be arranged to expand the gas or vapour by as much as 40:1 volumes so that the charge leaves the engine exhaust ports 7 at ambient pressure. As shown, there will be six impulses per revolution and the ducts 11 permit full expansions of the female cavity volume. It is probably not necessary to cool the casing 4, but the rotors must be internally cooled when using high temperature vapours or gases.

Both torque and speeds are high and the motor handles large volumes with great efficiency and requires no lubricant in the expansion chambers. The mechanical efficiency of all the engines and this motor described is around 95%. Labyrinth glands may be used for the male lobes in FIGURE 11, and as previously described, and they have been shown in the female rotor in FIGURE 12.

Figure 12:
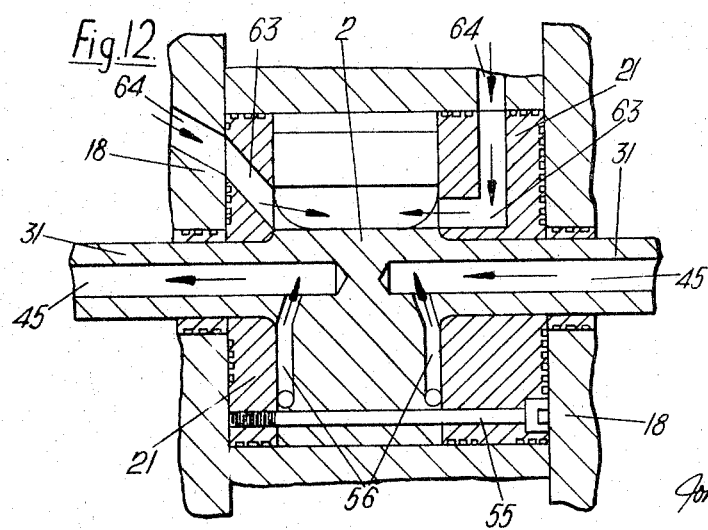
FIGURE 12 is a section through one of the female rotors 2 of FIGURE 11 and shows the method of leading the high pressure fluid medium into each female cavity.
Figure 6:
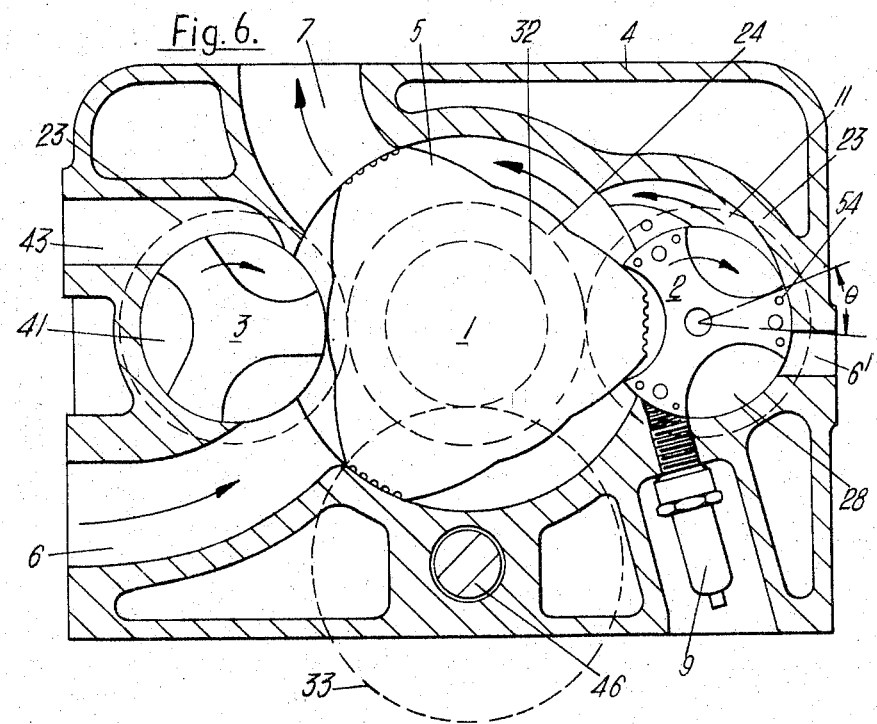
Figure 7:
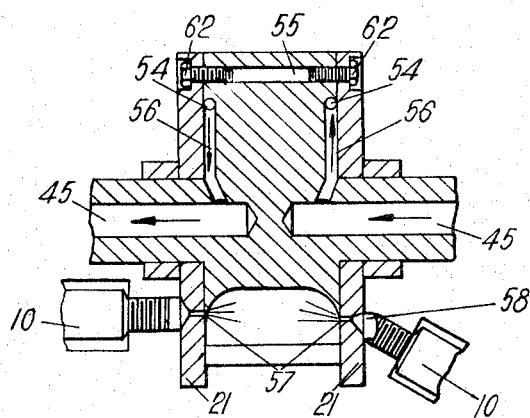
Figure 8:
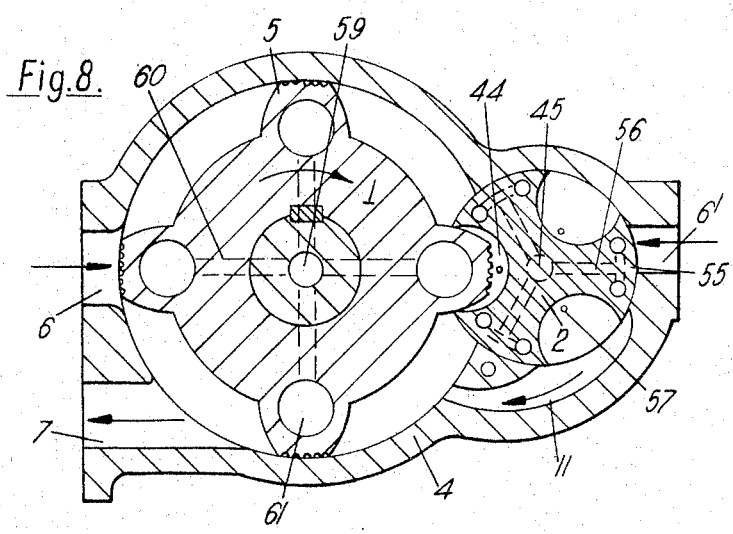
Figure 9:
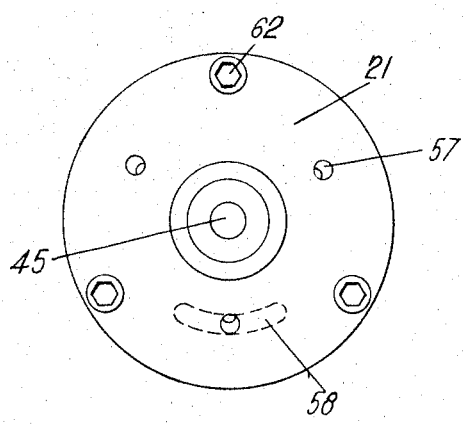

FIGURE 12 shows the duct 64 in the stator casing by which the high pressure gas passes either peripherally or by a side entrance. When the rotating ducts 63 fashioned in the rotating end plates 21 reach the ducts 64, high pressure gas flows into the female cavity but is immediately cut-off as the female rotor rotates. Admission is arranged to occur when the volume 44, see FIGURE 11, is at a minimum, whereupon, it is cut off and then expanded producing thrust on the male rotor lobes and hence torque on the motor shaft. In this embodiment this occurs six times per revolution but other arrangements of lobes and cavities and other speed ratios may be used.

I claim:

1. A rotary internal combustion engine comprising a male rotor having a plurality of substantially cycloidal shaped lobes about the circumference of said rotor, at least one female rotor adjacent said male rotor having its axis parallel to the axis of said male rotor, the periphery of said female rotor having a plurality of cavities therein for receiving said lobes, said cavities being shaped to effect sealing with the sides of said lobes and being deeper than the length of said lobes, a casing having radial walls defining intersecting parallel cylindrical bores housing said respective rotors, gear means for synchronizing the rotation of said rotors whereby each of the cavities in said female rotor receives a lobe of the male rotor during rotation, means for introducing an air and fuel mixture between said male rotor and the radial casing wall whereby during rotation said mixture is compressed by the leading face of each male rotor lobe as it approaches a female rotor cavity, a spark plug in said radial casing wall, and means synchronized with the rotation of said rotors for firing said spark plug, said spark plug being located adjacent the position at which said female rotor cavity is closed by said male rotor lobes and said firing means being synchronized to fire said spark plug just prior to the closing of said female rotor cavity.

2. In a rotary internal combustion engine as set forth in claim 1, at least one air inlet port in the casing for the admission of gaseous fluid to the spaces between consecutive male rotor lobes, and at least one outlet port in the casing for the exhaust of fluid from the spaces between consecutive male rotor lobes, said outlet port being disposed on that side of the plane containing the axes of rotation of said male and female rotors where the male lobes are receding from the female rotor and being located at such a distance around the male rotor bore from the female rotor that as the trailing flank of each male rotor lobe passes beyond said outlet port, and thereby opens communication to exhaust for expanding gas behind that lobe, compressed gas enclosed in a female rotor cavity by the next following male rotor lobe is beginning to act on the trailing flank of said next following lobe.

3. A machine according to claim 2, and comprising means such as a communicating pressure-balancing duct, to enable the high pressure gases in each female rotor cavity to expand fully and to the final exhaust pressure of the male rotor cell volume.

4. An engine according to claim 2, operating on a scavenged two-stroke type cycle using a blower.

5. An engine according to claim 4, having two similar working female rotors disposed on opposite sides of a common male rotor.

6. An engine according to claim 5, wherein the rotors have wide lobes in an arrangement such that no pressure equalising ducts between the female rotor cavities and male rotor cells are required.

7. An engine according to claim 2, wherein two rotors are disposed one on either side of the male rotor one being the working female rotor while the other constitutes a rotary barrier valve, the engine operating on a naturally-aspirated four-stroke cycle.

8. An engine according to claim 7, wherein fuel-air mixture is introduced from a carburetter.

9. An engine according to claim 8, wherein the rotary barrier valve has its cavities cut away on one flank to assist expulsion of the charge.

10. An engine according to claim 2, employing continuous fuel injection.

11. An engine according to claim 2, employing fuel injection at high pressure into each female cavity at or about top dead centre.

12. An engine according to claim 11, employing compression ignition.

13. An engine according to claim 2, employing timed spark ignition.

14. An engine according to claim 2, wherein labyrinth type recesses or indentations are provided to assist end sealing of the male rotor and lobes.

15. An engine according to claim 2, wherein the male and female rotors are cooled by the passing of coolant under pressure through internal passages thereof.

16. A machine according to claim 2, in which the male rotor has a different number of lobes to the number of cavities in the female rotor.

17. A motor according to claim 2, wherein high pressure working fluid enters the female rotor cavities.

18. A machine according to claim 2, wherein the female rotor has end plates which close the ends of the female cavities and are provided with labyrinth type seals.

19. A rotary internal combustion engine as set forth in claim 1, wherein said air and fuel mixture is formed by a fuel injector in said radial casing wall.

References Cited by the Examiner

UNITED STATES PATENTS

| | | | |
|---|---|---|---|
| 2,275,205 | 3/1942 | Straub | 123—13 |
| 2,863,425 | 12/1958 | Breelle | 123—13 |
| 2,870,752 | 1/1959 | Breelle | 123—13 |
| 2,920,610 | 1/1960 | Breelle | 123—13 |
| 2,927,560 | 3/1960 | Breelle | 123—13 |

FOREIGN PATENTS

| | | |
|---|---|---|
| 397,352 | 8/1933 | Great Britain. |
| 594,113 | 11/1947 | Great Britain. |

MARK NEWMAN, *Primary Examiner.*

F. T. SADLER, *Assistant Examiner.*